United States Patent
Thielen et al.

(10) Patent No.: US 7,071,251 B2
(45) Date of Patent: Jul. 4, 2006

(54) TIRE WITH COMPONENT COMPRISED OF RUBBER COMPOSITE OF STYRENE/BUTADIENE ELASTOMER CONTAINING PENDENT SILANOL AND/OR SILOXY GROUPS

(75) Inventors: Georges Marcel Victor Thielen, Schouweiler (LU); Marc Weydert, Luxembourg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 341 days.

(21) Appl. No.: 10/628,679

(22) Filed: Jul. 28, 2003

(65) Prior Publication Data

US 2004/0116587 A1 Jun. 17, 2004

Related U.S. Application Data

(60) Provisional application No. 60/411,396, filed on Sep. 17, 2002.

(51) Int. Cl.
*C08L 3/00* (2006.01)
(52) U.S. Cl. .......................... 524/47; 524/52; 524/506; 524/571
(58) Field of Classification Search ................. 524/47, 524/52, 506, 571
See application file for complete search history.

(56) References Cited

U.S. PATENT DOCUMENTS

| | | | | |
|---|---|---|---|---|
| 5,403,374 A | | 4/1995 | Kitagawa et al. .............. | 75/238 |
| 5,672,639 A | * | 9/1997 | Corvasce et al. .............. | 524/52 |
| 6,013,718 A | | 1/2000 | Cabioch et al. ............. | 524/506 |
| 6,071,995 A | | 6/2000 | Labauze ..................... | 524/269 |

OTHER PUBLICATIONS

EPO Search Report.

* cited by examiner

*Primary Examiner*—Peter D. Mulcahy
(74) *Attorney, Agent, or Firm*—Henry C. Young, Jr.

(57) ABSTRACT

The invention relates to a tire having at least one component (e.g. tread) of a rubber composition comprised of a styrene/butadiene elastomer composite comprised of a styrene/butadiene elastomer and a functionalized styrene/butadiene elastomer containing an internal silicon atom therein as a part of the elastomer, and at least one pendent silanol group and/or siloxy group from said silicon atom. Said elastomer composite is comprised of a significant polymodal (e.g. bimodal) molecular weight distribution between said styrene/butadiene elastomer and said functionalized styrene/butadiene elastomer. Said rubber composition contains synthetic, precipitated silica aggregates having hydroxyl groups on their surface which may be pre-treated (hydrophobated) to reduce hydroxyl groups contained on their surface prior to blending with said styrene/butadiene composite. Said rubber composition may contain a dispersion therein of a silica/plasticizer composite. Said rubber composition may be prepared by blending two bis(3-triethoxysilylpropyl) polysulfide coupling agents therewith, namely blending such polysulfide having an average of from 2 to 2.5 connecting sulfur atoms in its polysulfidic bridge in a non-productive mixing stage in the absence of addition of free sulfur and subsequently blending such polysulfide having an average of from 3.5 to 4 connecting sulfur atoms in its polysulfidic bridge in a productive mixing stage in combination with addition of free sulfur.

20 Claims, No Drawings

TIRE WITH COMPONENT COMPRISED OF RUBBER COMPOSITE OF STYRENE/BUTADIENE ELASTOMER CONTAINING PENDENT SILANOL AND/OR SILOXY GROUPS

The Applicants hereby incorporate by reference prior U.S. Provisional Application Ser. No. 60/411,396, filed on Sep. 17, 2002.

FIELD OF THE INVENTION

The invention relates to a tire having at least one component (e.g. tread) of a rubber composition comprised of a styrene/butadiene elastomer composite comprised of a styrene/butadiene elastomer and a functionalized styrene/butadiene elastomer containing an internal silicon atom therein as a part of the elastomer, and at least one pendent silanol group and/or siloxy group from said silicon atom. Said elastomer composite is comprised of a significant polymodal (e.g. bimodal) molecular weight distribution between said styrene/butadiene elastomer and said functionalized styrene/butadiene elastomer. Said rubber composition contains synthetic, precipitated silica aggregates having hydroxyl groups on their surface which may be pre-treated (hydrophobated) to reduce hydroxyl groups contained on their surface prior to blending with said styrene/butadiene composite. Said rubber composition may contain a dispersion therein of a silica/plasticizer composite. Said rubber composition may be prepared by blending two bis(3-triethoxysilylpropyl) polysulfide coupling agents therewith, namely blending such polysulfide having an average of from 2 to 2.5 connecting sulfur atoms in its polysulfidic bridge in a non-productive mixing stage in the absence of addition of free sulfur and subsequently blending such polysulfide having an average of from 3.5 to 4 connecting sulfur atoms in its polysulfidic bridge in a productive mixing stage in combination with addition of free sulfur.

BACKGROUND OF THE INVENTION

Tires are historically prepared with treads of a rubber composition which is comprised of various elastomers and particularly cis 1,4-polybutadiene and styrene/butadiene copolymer elastomers, although minor amounts of other elastomers are often present.

Tire tread rubber compositions conventionally contain particulate reinforcing fillers which are normally carbon black and/or aggregates of precipitated silica. Such reinforcement fillers are will known to those having skill in such art.

Sometimes, functionalized elastomers are suggested for use with precipitated silicas. For example, in U.S. Pat. No. 6,013,718, it has been proposed to provide a rubber composition including a functionalized diene polymer and silica in which the functionalized diene polymer bears a chain end as a silanol functional group or a polysiloxane block which has a silanol end. As a further example, in U.S. Pat. No. 6,071,995 such a proposal is made where a carbon black having silica fixed to its surface is suggested for use with a similar functionalized diene polymer.

In the description of the invention, the term "phr" relates to parts by weight of a particular ingredient per 100 parts by weight of rubber contained in a rubber composition.

The terms "rubber" and "elastomer" are used interchangeably unless otherwise indicated, and the terms "cure" and "vulcanize" may be used interchangeably unless otherwise indicated.

SUMMARY OF THE INVENTION

In accordance with this invention, a tire is provided having at least one component of a rubber composition comprised of, based upon 100 parts by weight of elastomer (phr), (A) 100 phr of elastomers comprised of:
  (1) about 30 to about 80 phr of a styrene/butadiene elastomer composite (SBR Composite) as a composite comprised of styrene/butadiene copolymer rubber (SBR-1) and a functionalized styrene/butadiene copolymer elastomer (SBR-2) which contains at least one pendent silanol and/or siloxy group and as a part of the elastomer chain to thereby divide said elastomer into at least two segments thereof (SBR-2A and SBR-2B) with a silicon atom of said pendent silanol and/or siloxy group therebetween, wherein said SBR Composite is thereby comprised of a polymodal (e.g. primarily bimodal) molecular weight configuration comprised about 35 to about 55 weight percent thereof of said (SBR-1) having a number average molecular weight (Mn) in a range of about 200,000 to about 300,000 and, correspondingly, about 65 to about 35 weight percent thereof of said (SBR-2) having a number average molecular weight (Mn) in a range of about 400,000 to 550,000; wherein said SBR Composite contains from zero to a maximum of ten weight percent of at least one additional styrene/butadiene copolymer elastomer pendent to said silicon atom elastomer (SBR-3) having an number average molecular weight (Mn) of greater than 550,000, alternatively between 550,000 and about 650,000 and having said styrene content and Tg values of said SBR-1 and SBR-2; and
  (2) about 20 to about 70 phr of at least one additional diene-based elastomer; and
(B) about 35 to about 100, alternately about 55 to about 100, phr of particulate reinforcement comprised of
  (1) about 35 to about 85, alternately about 50 to about 85, phr of at least one of synthetic amorphous silica (preferably precipitated silica) and silica treated carbon black which contains domains of silica on its surface, and mixtures thereof, wherein said synthetic silica and said silica domains contain hydroxyl groups (e.g. silanol groups) on their surfaces, and
  (2) from zero to about 15, alternately about 5 to about 15, phr of carbon black,
(C) a coupling agent having:
  (1) a moiety reactive with
    (a) said hydroxyl groups contained on the surface of said silica and silica treated carbon black; and
    (b) said silanol and/or siloxy groups of said SBR Composite, and;
  (2) another moiety interactive with the polybutadiene portion of said SBR Composite and said additional diene-based elastomer; and:
(D) optionally, about 1 to about 10 phr of a starch/plasticizer composite comprised of starch and plasticizer therefor of a weight ratio in a range of about 0.5/1 to about 5/1, wherein said starch/plasticizer composite has a softening point in a range of from 110° C. to 170° C. and;
(E) optionally said coupling agent as a combination of a bis-(3-triethoxysilylpropyl) polysulfide having an average of from 2 to 2.5 connecting sulfur atoms in its polysulfidic bridge and a bis-(3-triethoxysilylpropyl) polysulfide having an average of from 3 to 4 connecting sulfur atoms in its polysulfidic bridge, wherein said polysulfide having an average of from 2 to 2.5 connecting sulfur atoms in its polysulfidic bridge is blended with said rubber composition in the absence of sulfur and sulfur vulcanization accelerator and said polysulfide having an average of from 3 to 4 connecting sulfur atoms in its polysulfidic bridge and wherein said polysulfide having an average of from 3 to 4 connecting sulfur atoms in its polysulfidic bridge is thereafter blended with said rubber composition in the presence of sulfur and at least one sulfur vulcanization accelerator; and wherein said rubber composition is comprised of at least one of said starch/plasticizer composite and said combination of bis-(3-triethoxysilylpropyl) polysulfide coupling agents.

In practice, said SBR elastomers (SBR-1) and (SBR-2) may have a weight average molecular weight to number average molecular weight ratio (Mw/Mn) of not more than 2 and preferably in a range of about 1.01 to about 1.15, In one aspect of the invention, said (SBR-2) functionalized styrene/butadiene elastomer may, for example, be at least one styrene/butadiene copolymer elastomer of the general Formula (I):

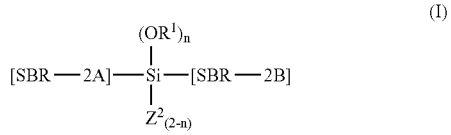
(I)

wherein said [SBR-2A] and [SBR-2B] are two individual elastomer segments with a silicon atom therebetween and each having a bound styrene content in a range of from about 25 to about 35 percent, a vinyl 1,2-content in a range of about 50 to about 70 percent based on the butadiene component of the respective styrene/butadiene (SBR-2) copolymer, a Tg in a range of about −15° C. to about −30° C.; wherein the silicon (Si) atom is attached to a butadiene moiety of the respective (SBR-2A) and (SBR-2B); $R^1$ is selected from hydrogen, methyl, ethyl, propyl, butyl and phenyl groups, preferably from hydrogen (thereby forming a silanol group) or as a methyl or ethyl group (and therefore forming an alkoxy group); and $Z^2$ is selected from an additional SBR segment of said styrene content and said Tg, an alkyl radical containing from 1 to about 18 carbon atoms, or an aromatic radical containing from 6 to about 12 carbon atoms, preferably from said alkyl radials and said aromatic radicals thereby yielding a linear silicon coupled elastomer; and where n is a value of from 1 to 2, preferably 2.

In practice, it is considered herein that the two elastomer segments [SBR-2A] and [SBR-2B] are of similar physical characteristics.

Accordingly, in one aspect of the invention, it is considered herein that said Formula (I) may be represented as a substantially linear silicon coupled elastomer as Formula (IA) or (IB):

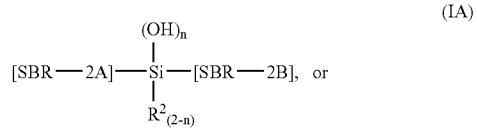
(IA)

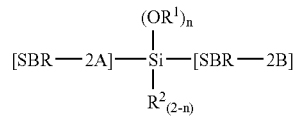
(IB)

wherein $R^1$ is selected from methyl, ethyl, propyl, butyl, and phenyl radicals, preferably an ethyl radical.

Representative examples of $R^2$ radicals are, for example, radicals selected from isopropyl, t-butyl, phenyl and tolyl radicals.

A significant aspect of this invention is, for a rubber tire tread, a rubber composition comprised of the combination of (SBR-1) and functionalized (SBR-2) having the said bimodal molecular weight distribution between said (SBR-1) and said (SBR-2), with said silicon atom contained in said functionalized (SBR-2) having a pendent hydroxyl or alkoxy group thereon, in combination with either of hereinafter referenced pre-treated (hydrophobated) silica aggregates, said starch/plasticizer composite and/or said combination of said bis-(3-ethoxysilylpropyl) polysulfide coupling agents.

Representative of such blend of styrene/butadiene copolymer rubber and silicon coupled, silanol and/or siloxane containing, styrene/butadiene elastomer is, for example, contemplated herein as T596 from the Japan Synthetic Rubber (JSR) Company.

In one aspect of the invention said coupling agent may be an organosulfur silane of the general formula (II):

$$(R^4O)_3-Si-R^5-S_x-R^5-Si-(R^4O)_3 \quad (II)$$

wherein $R^4$ is an alkyl radical selected from at least one of methyl and ethyl radicals, preferably an ethyl radical, $R^5$ is an alkylene radical having from 1 to 18 carbon atoms, preferably from 2 through 4 carbon atoms, and x is a value in a range of 2 to 8, with an average of from 2 to about 2.6 or from about 3.5 to about 4, preferably from 2 to 2.6;

In one aspect of the invention, the precipitated silica may, prior to blending with said elastomer(s), be:

(A) pre-treated with an with an alkylsilane of the general Formula (III) prior to blending with said elastomer(s) and said coupling agent;

(B) pre-treated with said coupling agent of formula (II);

(C) pre-treated with an organomercaptosilane of formula (IV), or (D) pre-treated with a combination of said alkylsilane of Formula (III) with and (1) said coupling agent of the general Formula (II) and/or (2) said organomercaptosilane of Formulas (IV), wherein said alkylsilane of the general Formula (III) is represented as:

$$X_n-Si-R^6_{4-n} \quad (III)$$

wherein $R^6$ is an alkyl radical having from 1 to 18 carbon atoms, preferably from 1 through 4 carbon atoms; n is a value of from 1 through 3; X is a radical selected from the group consisting of halogens, preferably chlorine, and alkoxy radicals selected from methoxy and ethoxy radicals, and wherein said organomercaptosilane of the general Formula (IV) is represented as:

$$(X)_n(R^7O)_{3-n}-Si-R^8-SH \quad (IV)$$

wherein X is a radical selected from a halogen, namely chlorine or bromine and preferably a chlorine radical, and from alkyl radicals having from one to 16, preferably from one through 4, carbon atoms, preferably selected from methyl, ethyl, n-propyl and n-butyl radicals; wherein $R^7$ is an alkyl radical having from one through 4 carbon atoms preferably selected from methyl and ethyl radicals and more preferably an ethyl radical; wherein $R^8$ is an alkylene radical having from one to 16, preferably from one through 4, carbon atoms, preferably a propylene radical; and n is an average value of from zero through 3, preferably zero.

A significant consideration for said pre-treatment of said silica is to reduce, or eliminate, evolution of alcohol during the mixing of the silica with said SBR composite such as may be caused, for example, by reaction of a coupling agent of Formula (II) with silanol groups of the aforesaid functionalized SBR and with hydroxy groups (e.g. silanol groups) contained on the surface of the silica.

By such practice of said pre-treatment of the silica prior to mixing with the rubber composition, a tire is provided which is comprised of a component of a rubber composition exclusive of any appreciable content of in situ formed alcohol which would inherently be expected to otherwise be formed by the reaction of a bis(3-triethoxysilyl) polysulfide coupling agent with, for example, hydroxyl groups contained on the precipitated silica and, where applicable, pendent hydroxyl groups contained in the SBR Composite.

A significant consideration of use of the said SBR composite which contains the aforesaid functionalized SBR-2 in a tire tread rubber composition, particularly where said precipitated silica is pre-treated with said organosulfursilane of formula (II) and/or said with said alkylsilane of formula (III), is a reduction, or eliminating, of evolution of alcohol during the mixing of the precipitated silica with said coupling agent (formula II) with the diene-based elastomer and functionalized elastomer insofar as the coupling agent is concerned which may be a consideration where it is desired that an alcohol is not released when mixing the respective ingredients with the respective elastomers.

Representative alkylsilanes of formula (III) for use in the practice of this invention are, for example, trichloromethylsilane, dichlorodimethylsilane, chlorotrimethylsilane, trimethoxymethylsilane, dimethoxydimethylsilane, methoxytrimethylsilane, trimethoxypropylsilane, trimethoxyoctylsilane, trimethoxyhexadecylsilane, dimethoxydipropylsilane, triethoxymethylsilane and diethoxydimethylsilane. Particularly representative alkylsilanes are dichlorodimethylsilane, chlorotrimethylsilane and hexamethyldisilazane.

Representative of organomercaptosilanes of formula (IV) for use in the practice of this invention are, for example organomercaptosilanes as, for example, mercaptomethyltrimethoxysilane, mercaptoethyltrimethoxysilane, mercaptopropyltrimethoxysilane, mercaptomethyltriethoxysilane, mercaptoethyltripropoxysilane and mercaptopropyltriethoxysilane. Particularly representative organomercaptosilanes of formula (IV) are mercaptopropyltriethoxysilane and mercaptopropyltrimethoxysilane.

Representative of organosulfursilanes of formula (II) are, for example, bis (3-alkoxysilylalkyl) polysulfides having from 2 to about 6, with an average of 2 to 2.6 or an average of from 3.5 to 4, connecting sulfur atoms in its polysulfidic bridge. For example, such materials might be selected from at least one of a bis-(3-triethoxysilylpropyl) disulfide material with an average of from 2 to 2.6 connecting sulfur atoms in its polysulfidic bridge, and a bis(3-triethoxysilylpropyl) tetrasulfide material with an average of from 3.5 to 4 connecting sulfur atoms in its polysulfidic bridge.

In one aspect of the invention, as hereinbefore discussed, the precipitated silica may be treated with both an alkylsilane, as a hydrophobating agent, represented by formula (III) optionally with a coupling agent represented by formula (II) and alternatively with the organomercaptosilane of formula (IV) whether by itself or in combination with said alkylsilane and/or coupling agent.

In practice of the invention, various other diene-based elastomers (other than and in addition to said SBR composite) may be used for tire tread rubber composition.

Such diene based elastomers may be, for example, homopolymers and copolymers of conjugated dienes such as for example isoprene and 1,3-butadiene and copolymers of such dienes with a vinyl aromatic compound such as styrene or alphamethyl styrene, preferably styrene.

Representative of such additional elastomers are, for example, cis 1,4-polyisoprene rubber (natural and synthetic), cis 1,4-polybutadiene rubber, styrene/butadiene copolymer rubber (prepared by aqueous emulsion of organic solvent polymerization and other than said elastomers contained in said SBR Composite), styrene/isoprene/butadiene terpolymer rubber, butadiene/acrylonitrile rubber, 3,4-polyisoprene rubber and isoprene/butadiene copolymer rubber.

In practice, the rubber composition may contain a tin and/or silicon coupled, preferably tin coupled, diene-based elastomer prepared by organic solvent polymerization in the presence of a suitable tin-based catalyst complex of at least one of isoprene and 1,3-butadiene monomers or of styrene together with at least one of isoprene and 1,3-butadiene monomers. Said tin and/or silicon coupled elastomers may be selected from, for example, styrene/butadiene copolymers, isoprene/butadiene copolymers, styrene/isoprene copolymers and styrene/isoprene/butadiene terpolymers. The preparation of tin and silicon coupled elastomers via organic solvent polymerization is well known to those having skill in such art.

In practice, the rubber composition may contain an additional functionalized diene-based elastomer. For example, an additional functionalized elastomer may be provided as a diene-based elastomer as described above which contains one or more functional groups as hydroxyl groups, carboxyl groups, amine groups and epoxy groups, which are available to participate in reactions with, for example rubber reinforcing fillers such as, for example, carbon black (actually moieties such as for example minor amounts of carboxyl groups on the surface of carbon black), carbon black which contains domains of silica on its surface, amorphous silica, clay (particularly water swellable clay such as for example Montmorillonite clay), and starch-based reinforcement. Such additional functionalized diene-based elastomers, and their preparation, are well known to those having skill in such art.

A starch/plasticizer for use in this invention is a composite of starch and plasticizer therefore. Such starch may be comprised of amylose units and amylopectin units in a ratio of, for example, about 10/90 to about 35/65, alternatively about 20/80 to about 30/70, and has a softening point according to ASTM No. D1228 in a range of about 180° C. to about 220° C.; and the starch/plasticizer composite itself having a softening point in a range of about 110° C. to about 170° C. according to ASTM No. D1228.

In practice, the starch/plasticizer composite may be desired to be used, for example, as a free flowing, dry powder or in a free flowing, dry pelletized form. In practice, it is desired that the synthetic plasticizer itself is compatible with the starch, and has a softening point lower than the softening point of the starch so that it causes the softening of the blend of the plasticizer and the starch to be lower than that of the starch alone.

For the purposes of this invention, the plasticizer effect for the starch/plasticizer composite, (meaning a softening point of the composite being lower than the softening point of the starch), can be obtained through use of a polymeric plasticizer such as, for example, poly(ethylenevinyl alcohol) with a softening point of less than 160° C. Other plasticizers, and their mixtures, are contemplated for use in this invention, provided that they have softening points of less than the softening point of the starch, and preferably less than 160° C., which might be, for example, one or more-copolymers and hydrolyzed copolymers thereof selected from ethylene-vinyl acetate copolymers having a vinyl acetate molar content of from about 5 to about 90, alternatively about 20 to about 70, percent, ethylene-glycidal acrylate copolymers and ethylene-maleic anhydride copolymers. As hereinbefore stated hydrolysed forms of copolymers are also contemplated. For example, the corresponding ethylene-vinyl alcohol copolymers, and ethylene-acetate vinyl alcohol terpolymers may be contemplated so long as they have a softening point lower than that of the starch and preferably lower than 160° C.

In general, the blending of the starch and plasticizer involves what are considered or believed herein to be relatively strong chemical and/or physical interactions between the starch and the plasticizer.

In general, the starch/plasticizer composite has a desired starch to plasticizer weight ratio in a range of about 0.5/1 to about 4/1, alternatively about 1/1 to about 2/1, so long as the starch/plasticizer composition has the required softening point range, and preferably, is capable of being a free flowing, dry powder or extruded pellets, before it is mixed with the elastomer(s).

The synthetic plasticizer(s) may be of a viscous nature at room temperature, or at about 23° C. and, thus, considered to be a liquid for the purposes of this description, although the plasticizer may actually be in a form of a viscous liquid at room temperature since it is to be appreciated that many plasticizers are polymeric in nature.

Representative examples of synthetic plasticizers are, for example, poly(ethylenevinyl alcohol), cellulose acetate and diesters of dibasic organic acids, so long as they have a softening point sufficiently below the softening point of the starch with which they are being combined so that the starch/plasticizer composite has the required softening point range.

Preferably, the synthetic plasticizer is selected from at least one of poly(ethylenevinyl alcohol) and cellulose acetate.

For example, the aforesaid poly(ethylenevinyl alcohol) might be prepared by polymerizing vinyl acetate to form a poly(vinylacetate) which is then hydrolyzed (acid or base catalyzed) to form the poly(ethylenevinyl alcohol). Such reaction of vinyl acetate and hydrolyzing of the resulting product is well known those skilled in such art.

For example, vinylalcohol/ethylene (60/40 mole ratio) copolymers can be obtained in powder forms at different molecular weights and crystallinities such as, for example, a molecular weight of about 11700 with an average particle size of about 11.5 microns or a molecular weight (weight average) of about 60,000 with an average particle diameter of less than 50 microns.

Various blends of starch and ethylenevinyl alcohol copolymers can then be prepared according to mixing procedures well known to those having skill in such art. For example, a procedure might be utilized according to a recitation in the patent publication by Bastioli, Bellotti and Del Trediu entitled A Polymer Composition Including Destructured Starch An Ethylene Copolymer, U.S. Pat. No. 5,403,374.

Other plasticizers might be prepared, for example and so long as they have the appropriate Tg and starch compatibility requirements, by reacting one or more appropriate organic dibasic acids with aliphatic or aromatic diol(s) in a reaction which might sometimes be referred to as an esterification condensation reaction. Such esterification reactions are well known to those skilled in such art.

It is readily understood by those having skill in the art that the rubber composition of the tire component for this invention would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

The presence and relative amounts of the above additives are not considered to be an aspect of the present invention which is more primarily directed to the utilization of the aforesaid SBR composite and aggregates of precipitated silica for a tire tread rubber composition.

The tires can be built, shaped, molded and cured by various methods which will be readily apparent to those having skill in such art.

The invention may be better understood by reference to the following example in which the parts and percentages are by weight unless otherwise indicated.

EXAMPLE I

Mixtures of diene rubber compositions were prepared comprised of recipes shown in Table 1 as Samples A, B, C and D, with Sample A being a Control Sample.

Control Sample A utilized a blend of cis 1,4-polybutadiene rubber and emulsion polymerization prepared styrene/butadiene rubber (E-SBR) rubber together with precipitated silica as Zeosil 1165 MP™ from Rhodia together with both an organosilane disulfide and an organosilane tetrasulfide coupling agent as a composites thereof with carbon black.

Samples B, C and D utilized a blend of cis 1,4-polybutadiene rubber and an internal, pendent silanol functionalized styrene/butadiene rubber, with Sample C also containing the above E-SBR, wherein Samples B, C and D contained precipitated silica as Zeosil 165GR™ from Rhodia, with Sample D containing also an addition of carbon black as reinforcement, wherein Samples B and C also contained said composite of said organosilane disulfide coupling agent and carbon black.

All the samples contained additional amounts of antidegradant(s) (para-phenylene diamine type), tackifying resin, fatty acid, zinc oxide, rubber processing oil, and peptizer.

The rubber blends are exemplified in the following Table 1.

TABLE 1

| Material | Control Sample A | Sample B | Sample C | Sample D |
|---|---|---|---|---|
| First Non-Productive Mix Stage (to about 165° C.) | | | | |
| Cis 1,4-polybutadiene rubber1 | 30 | 30 | 30 | 30 |
| E-SBR rubber2 | 96.25 | 0 | 20.62 | 0 |
| Silanol functionalized SBR3 | 0 | 96.25 | 75.63 | 96.25 |
| Antioxidant | 0.8 | 0.8 | 0.8 | 0.8 |
| Silica A4 | 62.5 | 0 | 0 | 0 |
| Silica B5 | 0 | 62.5 | 62.5 | 70 |
| Disulfide coupling agent6 | 10 | 10 | 10 | 11.23 |
| Waxes | 1.8 | 1.8 | 1.8 | 1.8 |
| Second Non-Productive Mix Stage (to about 165° C.) | | | | |
| Silica A4 | 23.25 | 0 | 0 | 0 |
| Silica B5 | 0 | 23.5 | 23.5 | 0 |
| Carbon black | 0 | 0 | 0 | 15 |
| Disulfide coupling agent6 | 3.8 | 3.8 | 3.8 | 0 |
| Stearic Acid | 3 | 3 | 3 | 3 |
| Antioxidant | 1.8 | 1.8 | 1.8 | 1.8 |
| Third Non-Productive Mix Stage (to about 155° C.) | | | | |
| Synthetic resin7 | 5 | 5 | 5 | 5 |
| Zinc oxide | 1 | 1 | 1 | 1 |
| Productive Mix Stage (to about 110° C.) | | | | |
| Sulfur | 1.4 | 1.4 | 1.4 | 1.4 |
| Tetrasulfide coupling agent8 | 2 | 2 | 2 | 2 |
| Accelerators9 | 4 | 4 | 4 | 4 |
| Zinc oxide | 1.5 | 1.5 | 1.5 | 1.5 |
| Antidegradant | 0.5 | 0.5 | 0.5 | 0.5 |

[1]Cis 1,4-polybutadiene rubber obtained as Budenel207 ™ from The Goodyear Tire & Rubber Company

[2]Emulsion polymerization prepared styrene/butadiene rubber containing about 40 percent bound styrene obtained as SB1721 from the Dow company and oil extended with 37.5 parts by weight rubber processing oil per 100 parts by weight of the rubber (72.7 parts by weight rubber and 27.3 parts by weight oil)

[3]Composite (SBR) of styrene/butadiene copolymer elastomers, namely a composite of solution polymerization prepared styrene/butadiene elastomer (SBR-1) and solution polymerization prepared functionalized styrene/butadiene elastomer (SBR-2) as a bimodal rubber composition (the SBR composite) having a bound styrene of about 27 percent based on the elastomer composite, a vinyl 1,2-content of about 64 percent basedon the butadiene component of the elastomer composite, and Tg of about −19° C. for the elastomer composite and a Mooney (1 + 4) viscosity at 100° C. of about 40 for the elastomer composite, wherein the (SBR-2) is functionalized by containing internal, pendent silanol groups, as T596 ™ from the JSR (Japan Synthetic Rubber) Corporation, oil extended with 37.5 parts by weight of oil per 100 parts of the elastomer composite.(72.7 parts by weight of elastomer composite and 27.3 parts by weight oil).

[4]Silica as Zeosil 1165MP from the Rhodia Company

[5]Silica as Zeosil 165GR from the Rhodia Company

[6]Coupling agent as X266S ™ as a bis (3-triethoxysilylpropyl) polysulfide containing from an average of about 2 to about 2.6 connecting sulfur atoms in its polysulfidic bridge, and referred to in this Example as a disulfide, on carbon carrier in a 50/50 weight ratio from Degussa-Hulls and reported in the Table on a basis of the disulfide material with the carbon black.

[7]Resin of the styrene/alpha-methylstyrene type

[8]Coupling agent as Si69 ™ as a bis (3-triethoxysilylpropyl) polysulfide containing from an average of about 3.5 to about 4 connecting sulfur atoms in its polysulfidic bridge, and referred to in this Example as a tetrasulfide, on carbon carrier in a 50/50 weight ratio from Degussa-Hulls and reported in the Table on a basis of the tetrasulfide material with the carbon black.

[9]Combination of accelerators of the sulfenamide and diphenyl guanidine types

EXAMPLE II

The prepared rubber Samples of Example I were cured at a temperature of about 160° C. for about 14 minutes and various physical properties (rounded numbers are reported herein) reported in the following Table 2.

TABLE 2

| Properties | Sample A (Control) | Sample B | Sample C | Sample D |
|---|---|---|---|---|
| Stress/strain | | | | |
| 100% modulus (MPa) | 1.9 | 2 | 2 | 2.2 |
| 300% modulus (MPa) | 8.9 | 9.8 | 9.7 | 10.4 |
| Hardness, Shore A | | | | |
| 23° C. | 68.1 | 64.8 | 65.6 | 66.7 |
| Rebound | | | | |
| 0° C. | 13.1 | 10.6 | 11.6 | 11.1 |
| 23° C. | 28 | 27.6 | 28.1 | 26 |
| 100° C. | 56.3 | 58.8 | 58 | 57.8 |

From Table 2 it is seen that Sample B, which contains the internal, pendent silanol functionalized S-SBR, provides a five percent increase in the Rebound (100° C.) property as compared to the Control Sample A, which contained relatively conventional elastomers, which is indicative of improved (reduced) rolling resistance for a tire for a tire having a tread of such composition, thus promoting better fuel economy for an associated vehicle.

From Table 2 it is also seen that Sample B, provides an improved Rebound (0° C.) property, as compared to the Control Sample A, which is indicative of improved wet skid (wet skid resistance) property for a tire having a tread of such rubber composition.

EXAMPLE III

Pneumatic tires A through D of size 195/65R15 with treads corresponding to Samples A through D of Example I, were prepared having treads of rubber compositions represented, respectively, by Sample A (Control), and Samples B through D of Example I in the following Table 3.

Rolling resistance (RR) rating of the tires, traction (stopping distance on wet and dry surfaces) and treadwear are normalized to a value of 100 for Control A tire.

TABLE 3

| Properties | Sample A (Control) | Sample B | Sample C | Sample D |
|---|---|---|---|---|
| Rolling resistance (RR) rating[1] | 100 | 106 | 102 | 102 |
| Wet surface braking rating[2] | 100 | 102 | 101 | 98 |
| Dry surface braking rating[2] | 100 | 102 | 102 | 102 |
| Treadwear resistance rating[3] | 100 | 107 | 107 | 102 |

[1]A higher RR rating value is considered as being better in a sense that a higher rating is used herein to indicate a lower rolling resistance for the respective tire and therefor more economical in terms of fuel consumption for the associated vehicle.
[2]A higher breaking rating value is considered better in a sense that it indicates a shorter stopping distance.
[3]A higher treadwear resistance rating is considered better in a sense that it represents a greater resistance to treadwear for the respective tire.

From Table 3 it can be seen that tire Sample B offers not only a superior compromise between rolling resistance/wet and dry skid and treadwear properties relative to tire Sample A but is also superior to Sample A in every individual aforementioned property.

EXAMPLE IV

Mixtures of diene rubber compositions were prepared comprised of recipes shown in Table 4 as Samples E, F, G and H, with Sample E being a Control Sample.

Control Sample E utilized a blend of cis 1,4-polybutadiene rubber and isoprene/butadiene copolymer rubber together with precipitated silica as Zeosil 1165MP from Rhodia together with both an organosilane disulfide and organosilane tetrasulfide coupling agents as a composites thereof with carbon black.

Sample F utilized a blend of cis 1,4-polybutadiene rubber and a composite of styrene/butadiene elastomers (SBR), namely a composite of a solution polymerization prepared styrene/butadiene elastomer (SBR-1) and an internal silanol functionalized styrene/butadiene rubber (SBR-2). Sample G utilized cis 1,4-polybutadiene rubber, emulsion polymerization prepared styrene/butadiene copolymer rubber (E-SBR) and said (SBR) composite. Sample H utilized cis 1,4-polybutadiene rubber and said (SBR) composite. All of Samples F through G contained silica reinforcement together with an organosilane disulfide coupling agent and Samples E and H also contained an organosilane tetrasulfide coupling agent.

Sample H also contained a starch/plasticizer composite, which replaced a portion of the silica, and addition of small amounts of rubber processing oil and carbon black.

All of the Samples contained additional amounts of antidegradant(s), microcrystalline wax(es)tackifying resin, fatty acid and zinc oxide.

The rubber blends are exemplified in the following Table 4.

TABLE 4

| Material | Sample E (Control) | Sample F | Sample G | Sample H |
|---|---|---|---|---|
| First Non-Productive Mix Stage (to about 165° C.) | | | | |
| Cis 1,4-polybutadiene rubber[1] | 10 | 30 | 30 | 30 |
| E-SBR rubber[2] | 0 | 0 | 20.62 | 0 |
| Isoprene/butadiene rubber[3] | 90 | 0 | 0 | 0 |

TABLE 4-continued

|  | Control | | | |
|---|---|---|---|---|
| Material | Sample E | Sample F | Sample G | Sample H |
| Silanol functionalized SBR[4] | 0 | 96.25 | 75.63 | 96.25 |
| Antioxidant | 0.8 | 0.8 | 0.8 | 0.8 |
| Silica A[5] | 78 | 0 | 0 | 0 |
| Silica B[6] | 0 | 80 | 80 | 65 |
| Disulfide coupling agent[7] | 12.8 | 12.8 | 12.8 | 10.4 |
| Stearic acid | 3.2 | 3 | 3 | 2 |
| Waxes | 1.5 | 1.5 | 1.5 | 1.5 |
| Second Non-Productive Mix Stage (to about 165° C.) | | | | |
| Carbon black | 0 | 0 | 0 | 6 |
| Rubber processing oil | 0 | 0 | 0 | 2 |
| Tetrasulfide coupling agent[8] | 0 | 0 | 0 | 2.6 |
| Starch/plasticizer composite[9] | 0 | 0 | 0 | 8 |
| Antioxidant | 1.8 | 1.8 | 1.8 | 1.8 |
| Stearic acid | 0 | 0 | 0 | 1 |
| Third Non-Productive Mix Stage (to about 155° C.) | | | | |
| Zinc oxide | 1 | 1 | 1 | 1 |
| Productive Mix Stage (to about 110° C.) | | | | |
| Sulfur | 1.4 | 2 | 2 | 2 |
| Tetrasulfide coupling agent[8] | 1.9 | 0 | 0 | 0 |
| Accelerators[10] | 3.2 | 1.8 | 1.8 | 3.2 |
| Zinc oxide | 1.5 | 2.5 | 2.5 | 2.5 |
| Antidegradant | 0.5 | 0.5 | 0.5 | 0.5 |
| Stearic Acid | 1.9 | 0 | 0 | 0 |

[1] Cis 1,4-polybutadiene rubber obtained as Budene 1207 ™ from The Goodyear Tire & Rubber Company
[2] Emulsion polymerization prepared styrene/butadiene rubber containing about 31 percent bound styrene obtained as SE S5820F from the Dow company and oil extended with 37.5 parts by weight rubber processing oil per 100 parts by weight of the rubber (72.7 parts by weight rubber and 27.3 parts by weight oil)
[3] Isoprene/butadiene copolymer rubber (50/50 isoprene/butadiene ratio) from The Goodyear Tire & Rubber Company
[4] Oil extended composite (SBR) as used in Example I
[5] Silica as Zeosil 1165MP from the Rhodia Company
[6] Silica as Zeosil 165GR from the Rhodia Company
[7] Coupling agent as X266S ™ as a bis (3-triethoxysilylpropyl) polysulfide containing from an average of about 2 to about 2.6 connecting sulfur atoms in its polysulfidic bridge, and referred to in this Example as a disulfide, on carbon carrier in a 50/50 weight ratio from Degussa-Hulls and reported in the Table on a basis of the disulfide material with the carbon black
[8] Coupling agent as Si69 ™ as a bis (3-triethoxysilylpropyl) polysulfide containing from an average of about 3.5 to about 4 connecting sulfur atoms in its polysulfidic bridge, and referred to in this Example as a tetrasulfide, on carbon carrier in a 50/50 weight ratio from Degussa-Hulls and reported in the Table on a basis of the tetrasulfide material with the carbon black
[9] Starch/plasticizer composite as a composite of starch and poly(ethylenevinylalcohol) (EVOH) obtained as Mater Bi 1128RR ™ from the Novamont Company
[10] Combination of accelerators of the sulfenamide and diphenyl guanidine types

EXAMPLE V

The prepared rubber Samples of Example I were cured at a temperature of about 160° C. for about 14 minutes and various physical properties (rounded numbers are reported herein) reported in the following Table 5.

TABLE 5

|  | Control | | | |
|---|---|---|---|---|
| Properties | Sample E | Sample F | Sample G | Sample H |
| Stress/strain | | | | |
| 100% modulus (MPa) | 2 | 2 | 1.8 | 2.4 |
| 300% modulus (MPa) | 9.5 | 10.9 | 9.6 | 13 |
| Hardness, Shore A | | | | |
| 23° C. | 67.3 | 65.5 | 62.8 | 63.6 |
| Rebound | | | | |
| 0° C. | 16.1 | 11.8 | 13.1 | 12.3 |
| 23° C. | 34 | 32.8 | 35.3 | 37.1 |
| 100° C. | 62.1 | 62 | 63 | 69.1 |
| DIN Abrasion, relative volume loss (cubic millimeters) | 124.9 | 122.7 | 125.6 | 119.1 |
| Tan Delta | | | | |
| −10° C. | 0.539 | 0.758 | 0.668 | 0.725 |
| +50° C. | 0.213 | 0.187 | 0.192 | 0.149 |

From Table 5 it is seen that Sample F, which contains the internal, pendent silanol functionalized S-SBR, provides a decrease in the Rebound (0° C.) property as compared to the Control Sample E, which is indicative of improved wet skid (skid resistance) property for a tire for a tire having a tread of such composition.

From Table 5 it is also seen that Sample H, which contains the starch/plasticizer composite provides an improved Rebound (100° C.) property, as compared to the Control Sample A, which is indicative of improved (reduced) rolling resistance for a tire having a tread of such rubber composition and thus improved fuel economy for an associated vehicle.

EXAMPLE VI

Pneumatic tires E through H of size 175/65R14, with treads corresponding to Samples E through H of Example IV, were prepared having treads of rubber compositions represented, respectively, by Sample E (Control), and Samples F through H of Example IV in the following Table 6.

Rolling resistance (RR) rating of the tires, traction (stopping distance on wet and dry surfaces) and treadwear are normalized to a value of 100 for Control E tire.

TABLE 6

| Properties | Control Sample E | Sample F | Sample G | Sample H |
|---|---|---|---|---|
| Rolling resistance (RR) rating[1] | 100 | 99 | 101 | 105 |
| Wet surface braking rating[2] | 100 | 104 | 102 | 99 |
| Dry surface braking rating[2] | 100 | 99 | 98 | 98 |
| Treadwear resistance rating[3] | 100 | 91 | 104 | 100 |

[1]A higher RR rating value is considered as being better in a sense that a higher value is used herein to indicate a lower rolling resistance for the respective tire and therefor more economical in terms of fuel consumption for the associated vehicle.
[2]A higher breaking rating value is considered better in a sense that it indicates a shorter stopping distance.
[3]A higher treadwear resistance rating is considered better in a sense that it represents a greater resistance to treadwear for the respective tire.

From Table 6 it can be seen that tire F, (Sample F) which contains the SBR composite, provides a large gain in wet skid property relative to tire E (Sample E), albeit at the cost of lower treadwear property (increase in treadwear).

Tire G (Sample G shows that an overall compromise of properties can be improved (e.g. acceptable combination of rolling resistance, acceptable dry and wet skid resistance and treadwear values) through an inclusion of some additional E-SBR for the elastomer matrix in the rubber composition.

Tire H (Sample H), which relative to Tire F, contains the starch/plasticizer composite shows an improved rolling resistance (less resistance to rolling) and treadwear (less tread wear) relative to Tire F at the expense of a reduction of wet skid (reduction in skidding resistance).

Overall, all three tires (Tires F, G and H) reflect an overall improvement in various properties relative to Control Tire E whether a single specific property or an overall compromise of tire performance properties.

While certain representative embodiments and details have been shown for the purpose of illustrating the invention, it will be apparent to those skilled in this art that various changes and modifications may be made therein without departing from the spirit or scope of the invention.

What is claimed is:

1. A tire having at least one component of a rubber composition comprised of, based upon 100 parts by weight of elastomer (phr),
   (A) 100 phr of elastomers comprised of:
      (1) about 30 to about 80 phr of a styrene/butadiene elastomer composite (SBR Composite) comprised of a styrene/butadiene elastomer (SBR-1) and a functionalized styrene/butadiene elastomer (SBR-2) which contains at least one silicon atom within said elastomer, and pendent silanol and/or siloxy groups therefrom, and as a part of the elastomer chain to thereby divide said elastomer into at least two segments thereof (SBR-2A and SBR-2B) with the silicon atom a of said pendent silanol and/or siloxy group therebetween, wherein said SBR Composite is thereby comprised of a polymodal molecular weight configuration comprised about 35 to about 55 weight percent thereof (SBR-1) having a number average molecular weight (Mn) in a range of about 200,000 to about 300,000 and, correspondingly, about 65 to about 35 weight percent thereof of said (SBR-2) having a number average molecular weight (Mn) in a range of about 400,000 to 550,000; wherein said SBR Composite contains from zero to a maximum of ten weight percent of at least one additional styrene/butadiene elastomer (SBR-3) pendent from said silicon atom having an number average molecular weight (Mn) of greater than 550,000, alternatively between 550,000 and about 650,000 and having styrene contend and Tg values in the range thereof of said SBR-2 and SBR-2;
      (2) about 20 to about 70 phr of at least one additional diene-based elastomer; and
   (B) about 35 to about 100 phr of particulate reinforcement comprised of
      (1) about 35 to about 85, phr of at least one of synthetic amorphous precipitated silica and silica treated carbon black which contains domains of silica on its surface, and mixtures thereof, wherein said synthetic silica and said silica domains contain hydroxyl groups on their surfaces, and
      (2) from zero to about 15 phr of carbon black,
   (C) a coupling agent having:
      (1) a moiety reactive with
         (a) said hydroxyl groups contained on the surface of said silica and silica treated carbon black; and
         (b) said silanol and/or siloxy groups of said SBR Composite, and;
      (2) another moiety interactive with the polybutadiene portion of said SBR Composite and with said additional diene-based elastomer; and:
   (D) about 2 to about 10 phr of a starch/plasticizer composite comprised of starch and plasticizer therefor of a weight ratio in a range of about 0.05/1 to about 4/1, wherein said starch/plasticizer composite has a softening point in a range of about 110° C. to about 170° C. or
said coupling agent as a combination of a bis-(3-triethoxysilylpropyl) polysulfide having an average of from 2 to 2.5 connecting sulfur atoms in its polysulfidic bridge and a bis-(3-triethoxysilylpropyl) polysulfide having an average of from 3 to 4 connecting sulfur atoms in its polysulfidic bridge, wherein said polysulfide having an average of from 2 to 2.5 connecting sulfur atoms it its polysulfidic bridge is blended with said rubber composition in the absence of sulfur and sulfur vulcanization accelerator and wherein said polysulfide having an average of from 3 to 4 connecting sulfur atoms in its polysulfidic bridge is thereafter blended with said rubber composition in the presence of sulfur and at least one sulfur vulcanization accelerator.

2. The tire of claim 1 wherein said elastomer segments have a weight average molecular weight to number average molecular weight ratio (Mw/Mn) of not more than 2.

3. The tire of claim 1 wherein said functionalized styrene/butadiene elastomer (SBR-2) is of the general Formula (I):

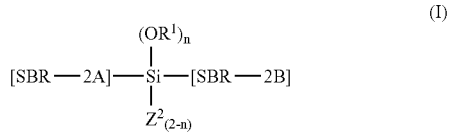

wherein said [SBR-2A] and [SBR-2B] each have a bound styrene content in a range of from about 25 to about 35 percent, a vinyl 1,2-content in a range of about 50 to about 70 percent based on the butadiene component of the SBR, a Tg in a range of about -15° C. to about -30° C.; wherein the silicon (Si) atom is attached to a butadiene moiety of the respective SBRs; $R^1$ is selected from is selected from hydrogen, methyl, ethyl, propyl, butyl and phenyl groups, and $Z^2$ is selected from an additional SBR segment of said styrene content and said Tg, an alkyl radical containing from 1 to about 18 carbon atoms, or an aromatic radical containing from 6 to about 12 carbon atoms, and where n is a value of from 1 to 2.

4. The tire of claim 3 wherein n is 2.

5. The tire of claim 1 wherein said SBR-2 is represented as Formula (IA):

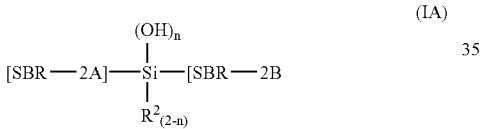

wherein $R^2$ is selected from isopropyl, t-butyl, phenyl and tolyl radicals and n is a value of 1 to 2.

6. The tire of claim 5 wherein n is 2.

7. The tire of claim 1 wherein said SBR-2 is represented as Formula (IB):

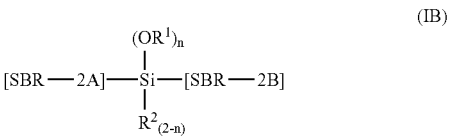

wherein $R^1$ is selected from methyl, ethyl, propyl, butyl, and phenyl radicals and $R^2$ is selected from isopropyl, t-butyl, phenyl and tolyl radicals and n is a value of from 1 to 2.

8. The tire of claim 7 wherein n is 2.

9. The tire of claim 1 wherein said coupling agent is an organosulfur silane of the general formula (II):

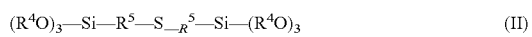

wherein $R^4$ is an an ethyl radical, $R^5$ is an alkylene radical having from 2 through 4 carbon atoms, and x is a value in a range of 2 to 8, with an average of from 2 to about 2.6 or from about 3.5 to about 4.

10. The tire of claim 1 wherein said coupling agent is a bis(3-triethoxysilylpropyl) polysulfide having an average of from 2 to 2.6 connecting sulfur atoms in its polysulfidic bridge.

11. The tire of claim 1 wherein said precipitated silica, prior to blending with said elastomer(s), is:

(A) pre-treated with an with an alkylsilane of the general Formula (III) prior to blending with said elastomer(s) and said coupling agent;

(B) pre-treated with said coupling agent of formula (II);

(C) pre-treated with an organomercaptosilane of formula (IV), or (D) pre-treated with a combination of said alkylsilane of Formula (III) with and (1) said coupling agent of the general Formula (II) and/or (2) said organomercaptosilane of Formulas (IV), wherein said alkylsilane of the general Formula (III) is represented as:

wherein $R^6$ is an alkyl radical having from 1 to 18 carbon atoms; n is a value of from 1 through 3; X is a radical selected from chlorine, methoxy and ethoxy radicals, and wherein said organomercaptosilane of the general Formula (IV) is represented as:

wherein X is a radical selected from chlorine, bromine and from alkyl radicals having from one through 4 carbon atoms; wherein $R^7$ is an alkyl radical having from one through 4 carbon atoms; wherein $R^8$ is an alkylene radical having from one through 4, carbon atoms; and n is an average value of from zero through 3.

12. The tire of claim 11 wherein, for said Formula (IV), X is chlorine and $R^7$ is selected from methyl and ethyl radicals and n is an average value of about 3.

13. The tire of claim 11 wherein, for said Formula (IV), $R^7$ is an ethyl radical and n is zero.

14. The tire of claim 11 wherein said alkylsilanes of formula (III) are selected from at least one of the group consisting of trichloromethylsilane, dichlorodimethylsilane, chlorotrimethylsilane, trimethoxymethylsilane, dimethoxydimethylsilane, methoxytrimethylsilane, trimethoxypropylsilane, trimethoxyoctylsilane, trimethoxyhexadecylsilane, dimethoxydipropylsilane, triethoxymethylsilane and diethoxydimethylsilane.

15. The tire of claim 11 wherein said organomercaptosilanes of formula (IV) are selected from at least one of the group consisting of mercaptomethyltrimethoxysilane, mercaptoethyltrimethoxysilane, mercaptopropyltrimethoxysilane, mercaptomethyltriethoxysilane, mercaptoethyltripropoxysilane, mercaptopropyltriethoxysilane and mercaptopropyltrimethoxysilane.

16. The tire of claim 1 wherein said rubber composition contains from about 1 to about 10 phr of said starch/plasticizer composite.

17. The tire of claim 16 wherein starch/plasticizer composite is a composite of starch and synthetic plasticizer comprised of at least one of poly(ethylenevinyl alcohol) and cellulose acetate.

18. The tire of claim 1 wherein said coupling agent is a combination of a bis-(3-triethoxysilylpropyl) polysulfide having an average of from 2 to 2.5 connecting sulfur atoms in its polysulfidic bridge and a bis-(3-triethoxysilylpropyl) polysulfide having an average of from 3 to 4 connecting sulfur atoms in its polysulfidic bridge, wherein said polysulfide having an average of from 2 to 2.5 connecting sulfur atoms in its polysulfidic bridge is blended with said rubber composition in the absence of sulfur and sulfur vulcanization accelerator and wherein said polysulfide having an average of from 3 to 4 connecting sulfur atoms in its polysulfidic bridge is thereafter blended with said rubber composition in the presence of sulfur and at least one sulfur vulcanization accelerator.

19. The tire of claim 11 wherein said component rubber composition is exclusive of any appreciable content of in situ formed alcohol.

20. The tire of claim 19 wherein said component is a tire tread.

* * * * *